(12) United States Patent
Ward

(10) Patent No.: US 8,707,338 B2
(45) Date of Patent: Apr. 22, 2014

(54) VISUAL ENHANCEMENT FOR TURNTABLE PLAYBACK

(76) Inventor: Joseph Ward, Dorchester, MA (US)

( * ) Notice: Subject to any disclaimer, the term of this patent is extended or adjusted under 35 U.S.C. 154(b) by 0 days.

(21) Appl. No.: 13/237,860

(22) Filed: Sep. 20, 2011

(65) Prior Publication Data
US 2012/0230175 A1  Sep. 13, 2012

(51) Int. Cl.
*G11B 33/06* (2006.01)
*G11B 31/00* (2006.01)
*G11B 23/00* (2006.01)

(52) U.S. Cl.
USPC ............ 720/695; 369/69; 362/35; 362/811; 362/87; 84/464 R

(58) Field of Classification Search
USPC .............. 369/63, 69, 70, 264, 271.1, 75.11; 362/35, 811, 87; 40/431, 456; 84/464 R; 720/695
See application file for complete search history.

(56) References Cited

U.S. PATENT DOCUMENTS

| | | | | |
|---|---|---|---|---|
| 3,122,966 A | * | 3/1964 | Butterfield | 353/18 |
| 3,885,797 A | * | 5/1975 | Booty et al. | 369/69 |
| 4,089,598 A | * | 5/1978 | Meyer et al. | 353/17 |
| 4,168,836 A | * | 9/1979 | Weinberg et al. | 369/270.1 |
| 4,214,683 A | * | 7/1980 | Wills et al. | 224/42.2 |
| 5,319,531 A | * | 6/1994 | Kutnyak | 362/184 |
| 5,475,572 A | * | 12/1995 | Tseng | 362/545 |
| 5,683,164 A | * | 11/1997 | Chien | 362/500 |
| 5,957,541 A | * | 9/1999 | Seigler | 301/5.301 |
| 7,768,897 B2 | | 8/2010 | Bregenzer | |
| 2004/0057344 A1 | * | 3/2004 | Baumann et al. | 369/18 |
| 2004/0141311 A1 | * | 7/2004 | Chen et al. | 362/84 |
| 2005/0082774 A1 | * | 4/2005 | Chiu | 280/11.203 |
| 2006/0093777 A1 | | 5/2006 | Handy et al. | |
| 2008/0001056 A1 | | 1/2008 | Bregenzer | |
| 2008/0002400 A1 | * | 1/2008 | Huang | 362/216 |
| 2009/0268427 A1 | * | 10/2009 | Ashby | 362/34 |

FOREIGN PATENT DOCUMENTS

| | | | | |
|---|---|---|---|---|
| CN | 2875544 Y | * | 3/2007 | |
| CN | 200957298 Y | * | 10/2007 | |
| GB | 2486816 A | * | 6/2012 | |
| WO | WO 9803236 A1 | * | 1/1998 | |

OTHER PUBLICATIONS

Custom Slip Mats by Silkmats, downloaded May 19, 2011 from http://www.slikmats.org, 2010.

* cited by examiner

*Primary Examiner* — Will J Klimowicz
(74) *Attorney, Agent, or Firm* — BainwoodHuang

(57) ABSTRACT

An apparatus for enhancing media playback on a turntable, such as an audio record turntable, includes an illumination apparatus. The illumination apparatus is generally placed on the turntable's platter, beneath a record to be played. The record may be transparent or semi-transparent. The illumination apparatus includes a light source that projects light up through the record for producing a visual effect.

16 Claims, 3 Drawing Sheets

VISUAL ENHANCEMENT FOR TURNTABLE PLAYBACK

CROSS-REFERENCES TO RELATED APPLICATIONS

Not Applicable.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO A "SEQUENCE LISTING," A TABLE, OR A COMPUTER PROGRAM LISTING APPENDIX

Not Applicable.

BACKGROUND OF THE INVENTION

Disk jockeys ("DJ's"), both professional and amateur, conventionally use slipmats in their performances. As is known, slipmats are mats having about the same size and shape as record disks (e.g., 12-inch LP's). A slipmat is generally placed directly on a turntable's platter, with a spindle of the turntable passing through a central hole in the slipmat. A record is then placed on top of the slipmat. One or both surfaces of the slipmat generally have a low coefficient of friction. The slipperiness of the slipmat allows the turntable to continue spinning at or near its usual rate, while the DJ manually manipulates the record to introduce various effects, such as slowing down the record, pausing, reversing, and "scratching."

Slipmats come in a variety of types. Some have customized designs printed on them or woven into them. US Patent Document No. 2006/0093777 discloses a slipmat with designs made with phosphorescent material, allowing the designs to "glow in the dark" after being exposed to strong light sources.

Also, U.S. Pat. No. 7,768,897 discloses a slipmat having an elevated surface. The elevated surface has a circumferential edge which may contain lights, such as LEDs, which project light out to the sides. A battery may be attached beneath the elevated surface for powering the lights.

Further, DJ's commonly use transparent or translucent records. These may be clear or provided in any number of colors. Some of these records contain ordinary analog recordings. Others include time and/or pitch information and are designed to work in connection with DJ control software. Examples of transparent time and/or pitch-encoded records include "Control Vinyl" from Serato Audio Research of Auckland, New Zealand, "FS Standard Records" from Stanton Magnetics of Hollywood, Fla., "Time Code Vinyl" from Native Instruments of Los Angeles, Calif., and "Torque Control Vinyl" from M-Audio of Irwindale, Calif.

BRIEF SUMMARY OF THE INVENTION

Unfortunately, there are shortcomings associated with designer, glow-in-the-dark, and side-illuminating slipmats, as well as with transparent and translucent records.

Designer slipmats are only visible when no record is being played. Once a record is placed on a turntable over a slipmat, even when a clear record is used, the record effectively blocks the slipmat and prevents it from being viewed. Since the slipmat is covered for most of a DJ's performance, any design on the slipmat might rarely be seen.

Glow-in-the-dark slipmats generally produce only a small amount of light, and only after they are effectively "charged" by a strong light source. They may then be visible in dark environments for a short period of time, but are not generally visible in brightly lit environments. Also, light output from glow-in-the-dark slipmats is generally too weak to be seen through records, even transparent records, unless the room is very dark, the observer is very close, and the slipmat has very recently been charged.

Slipmats that emit light to the sides can produce decorative effects. However, these effects are limited to lighting that fits around the circumference of the slipmat.

Transparent and translucent records can be visually appealing, but they are sometimes difficult to see during DJ performances. Once they are placed on a turntable, their appearance is static and their colors may simply appear dark.

An improvement over the aforementioned art is achieved with an apparatus that has a disk-shaped body and an internal, powered light source. The disk-shaped body has a top surface through which light is projected. The light is strong enough to be seen under most indoor lighting conditions and through any transparent or translucent record.

In one example, the apparatus is used in connection with a mask. The mask has a design. The mask is placed between the apparatus and the record. When the powered light source from the apparatus is operating, the design on the mask is visible through the record in the vicinity of the turntable.

One embodiment is directed to an apparatus for enhancing media playback on a turntable. The apparatus includes a disk-shaped body having a top surface, a bottom surface, and a central hole through the body. A powered light source is provided within the body for projecting light upwards through the top surface.

Another embodiment is directed to a system for media playback. The system includes a turntable having a base, a platter, and a spindle. The system further includes a powered apparatus with a central hole. The powered apparatus is disposed on the platter with the spindle extending through the central hole. The powered apparatus has a top surface and a powered light source for projecting light upwards through the top surface.

In yet another embodiment, a method of enhancing media playback includes placing an apparatus having an internal, powered light source on a playback turntable, placing a non-opaque record disk over the apparatus, and projecting light from the apparatus up and through the non-opaque record disk, thereby producing a visual effect.

BRIEF DESCRIPTION OF THE SEVERAL VIEWS OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

A technique for visually enhancing turntable playback involves the use of a powered illumination apparatus that may be placed on a turntable. The illumination apparatus has a built-in, powered light source capable of projecting light up and through transparent or translucent record disks. Also, various masks may be used between the illumination apparatus and a record for projecting specific designs up and through the record, where they are viewable by people in the vicinity of the turntable.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Figure 1:
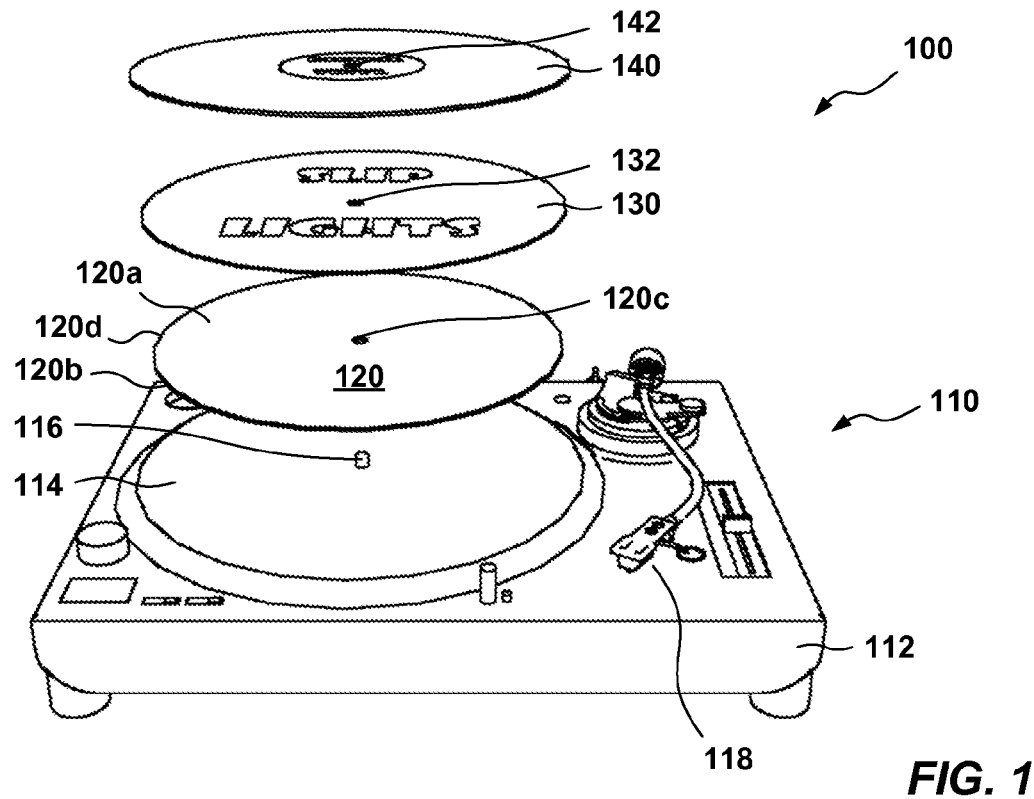
FIG. 1 is an exploded, perspective view of an example system for media playback.

FIG. 1 shows an example system 100 for enhancing turntable playback. The system 100 includes a turntable 110, a powered illumination apparatus 120, a mask 130, and a non-opaque (e.g., transparent or translucent) record disk 140. The turntable has a base 112, a platter 114, a spindle 116, and a needle 118. The illumination apparatus 120 has a non-opaque top surface 120a, a bottom surface 120b, a central hole 120c, and an outer edge 120d. The mask 130 and record 140 each have a central hole, 132 and 142, respectively. In normal use, the system is arranged with the illumination apparatus 120, mask 130, and record 140 resting in the order shown on the platter 114 of the turntable 110, with the spindle 116 extending respectively through the holes 120c, 132, and 142. A DJ can then play the record 140, or, in the case of a time and/or pitch-encoded record, use the record 140 in connection with DJ software.

Preferably, the top surface 120a of the illumination apparatus 120 has a low coefficient of friction, so that it is able to be used as a slipmat. To this end, the top surface 120a is preferably composed of a slippery material, such as smooth plastic, for example. The bottom surface 120b can be composed of a less slippery material, such as neoprene or rubber, for example. The illumination apparatus 120 thus generally spins with the platter 114, whereas the record 140 easily slips in response to manual movements by the DJ.

The mask 130 is preferably also composed of a slippery material, such as paper or plastic, for example, so as not to resist movement of the record 140 relative to the illumination apparatus 120 during performances.

With the arrangement shown, the illumination apparatus 120 may project light up and through the mask 130 and record 140, which may be viewed by audience members or others nearby. In one example, the illumination apparatus 120 can project light of approximately uniform brightness across its top surface 120a, so as to evenly illuminate and project through the mask 130 and record 140. The light emitted from the illumination apparatus 120 can be white light, a specific color of light, or patterns of light with different colors and/or brightness.

The mask 130 can have a pattern printed or otherwise formed in or on it. The pattern acts to filter light from the illumination apparatus 120. Light transmitted through the mask 130 is projected through the record 140, where it can be easily seen. The pattern formed on the mask 130 can be black and white, shades of gray, and/or color. It can include regions of varying opacity. Typically, a DJ will have several masks 130 that can be interchanged during a performance, or for different performances, for projecting different images. The images can be any desired image, such as the DJ's logo, an advertisement, or a picture, for example.

In another example, the illumination apparatus 120 can directly project images, without the need for a mask 130. For example, the illumination apparatus 120 may contain an array of independently controllable light sources, which may be selectively powered to produce varying patterns or images. Along these lines, the illumination apparatus 120 can contain a video display, such as is used by laptop computers or tablets, which can project any arbitrary image.

A wide variety of visual effects can be produced. These effects can include 2-dimensional images covering nearly the entire area of the record. Substantial advertising, promotional, and/or performance space can therefore be put to productive use, while a DJ is performing, records are playing, and attention is focused on the DJ.

Figure 2:
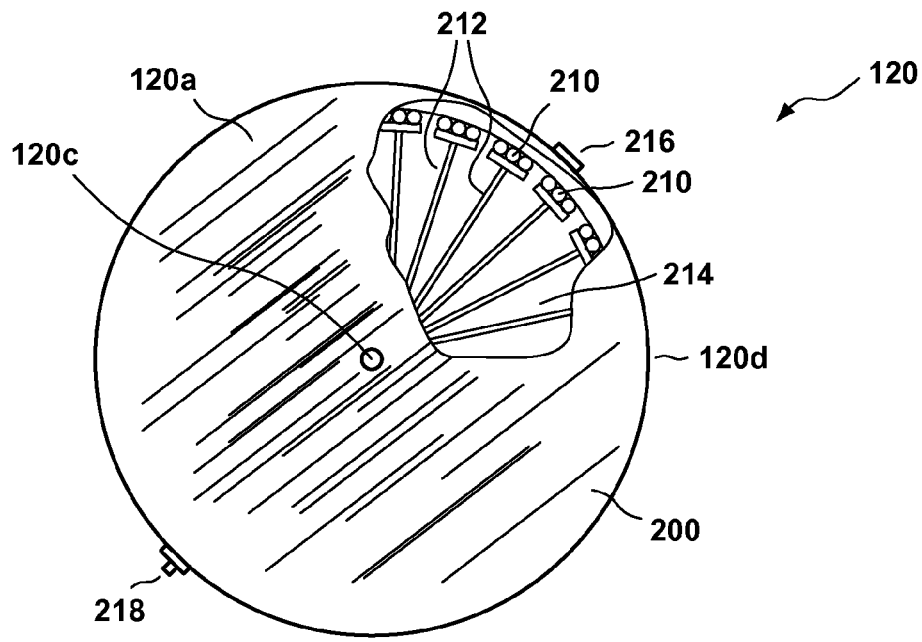
FIG. 2 is a top view of an apparatus of FIG. 1.

FIG. 2 shows an example of the illumination apparatus 120 in greater detail. Here, the illumination apparatus 110 is seen to have a cylindrical body 200, which includes the top surface 120a, bottom surface 120b, and outer edge 120d. The top surface 120a is composed of a transparent or translucent material, such as clear plastic. It may have a texture, preferably on an interior surface, for diffusing emitted light.

In this FIG. 2, portions of the non-opaque top surface 120a are cut away to reveal certain contents. These include powered light sources, such as RGB LED strips 210, fiber optic light pipes 212, and a backing 214. The RGB LED strips include multiple groups of three LED's, whose output power can be independently controlled to generate light covering a wide range of colors and brightness. The light pipes 212 extend from the RGB LED strips 210 for creating illuminated tubes. Light from the RGB LED strips 210 is coupled into the light pipes 212, which emit the light in all directions. The backing 214 reflects light up and through the top surface 120a. The backing 214 can be composed of any suitable material, such as metal or plastic. It can have a mirrored surface or simply a light color. In one example, the backing 214 is white plastic.

The RGB LEDs 210 and light pipes 212 can be arranged within the illumination apparatus 120 in any suitable manner. For instance, they can be arranged radially (as shown), in concentric circles, in one or more spirals, or in any other way.

The example illumination apparatus 120 also includes a charging port 216 and a power switch 218. The charging port 216 has at least two terminals. The terminals can connect to an AC adapter or other power source for charging an internal battery (see FIG. 3). The switch 218 has at least two positions, for allowing the illumination apparatus 120 to be turned on and off.

To avoid introducing distortion in record playback, the illumination apparatus 120 preferably has a thickness no greater than approximately 10 mm. The illumination apparatus 120 can be made thicker, however, if adjustments are made to the turntable 110 (e.g., the needle is mounted higher) or if distortion is not problematic, such as where time and/or pitch-encoded records are used. Also, the charging port 216 and switch 218 are preferably low profile devices that extend neither above the plane of the top surface 120a nor below the plane of the bottom surface 120b.

Figure 3:
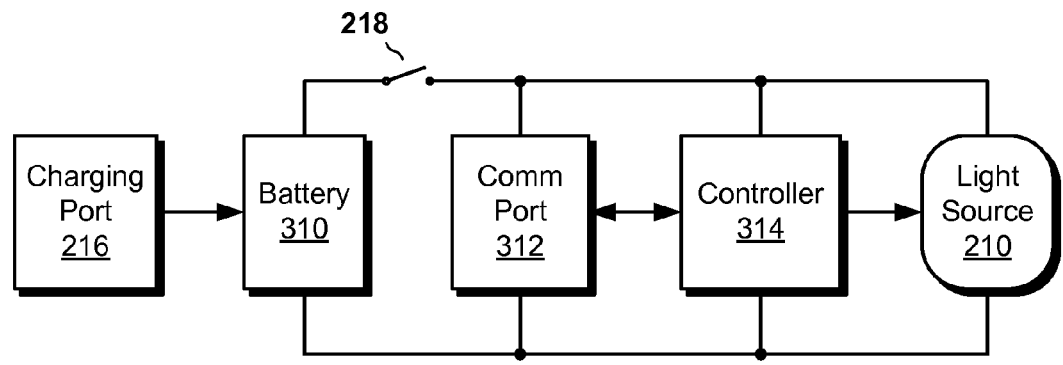
FIG. 3 is an electrical block diagram of the apparatus of FIG. 2.

FIG. 3 shows an example of electrical components of the illumination apparatus 120. These components include the charging port 216, switch 218, and light source 210/212. They also include a battery 310, a communications port 312, and a controller 314.

The charging port 216 is connected to the battery 310 for charging the battery 310 as needed. It is understood that the charging port 216 may receive power from any suitable source, such as an AC adapter, an external bulk storage battery, a USB port (e.g., of a computer), or any other source. The battery 310 may be of any suitable type, such as nickel cadmium, nickel metal hydride, or lithium, for example. The battery 310 may consist of a single cell or multiple cells. Where multiple cells are used, the cells may be grouped together in a single location within the body 200, or distributed within the body 200 so as to avoid impairing the uniformity of emitted light.

In an example, the communications port 312 is a wireless port, such as Bluetooth or WiFi. The communications port 312 is configured to communicate with an external device, such as a computer, PDA, smart phone, tablet computer, or the like, for receiving instructions and pattern and/or image information of images to be displayed.

The communications port 312 is operatively connected to the controller 314. In an example, the controller 314 is a logic circuit, microprocessor, or other processor. The controller 314 receives pattern and/or image information from the communications port 312 and directs the light source 210/212 to produce corresponding patterns and/or images.

The various elements of FIG. 3 may be connected together using a circuit board (not shown). In an example, the circuit board is made of a flexible material to afford the illumination apparatus 120 a generally flexible characteristic. Alternatively, the elements of FIG. 3 may be directly hardwired together, connected using cables, or connected using other means.

In a simple example, the communications port 212 is configured for receiving manual inputs from a user, rather than electronic inputs from an external computing device. For instance, the communications port 212 can be implemented with one or more switches, which may be accessed via the bottom surface 120b of the illumination apparatus 120. A user can operate the switches to identify a particular pattern or sequence of patterns of lighting. For instance, a bank of 8 mini-switches can be provided to uniquely identify 256 different predetermined patterns. The controller 314 can read the switches, look up the corresponding pattern (e.g., from a local memory), and direct the light source 210/212 to illuminate according to the corresponding pattern.

Also, it is understood that other examples may omit the charging port 216, switch 218, communication port 312, and/or controller 314. Still other examples may include additional components. Indeed, implementations of varying complexity, with varying features, may be provided within the scope of the high level ideas presented herein.

Figure 4:
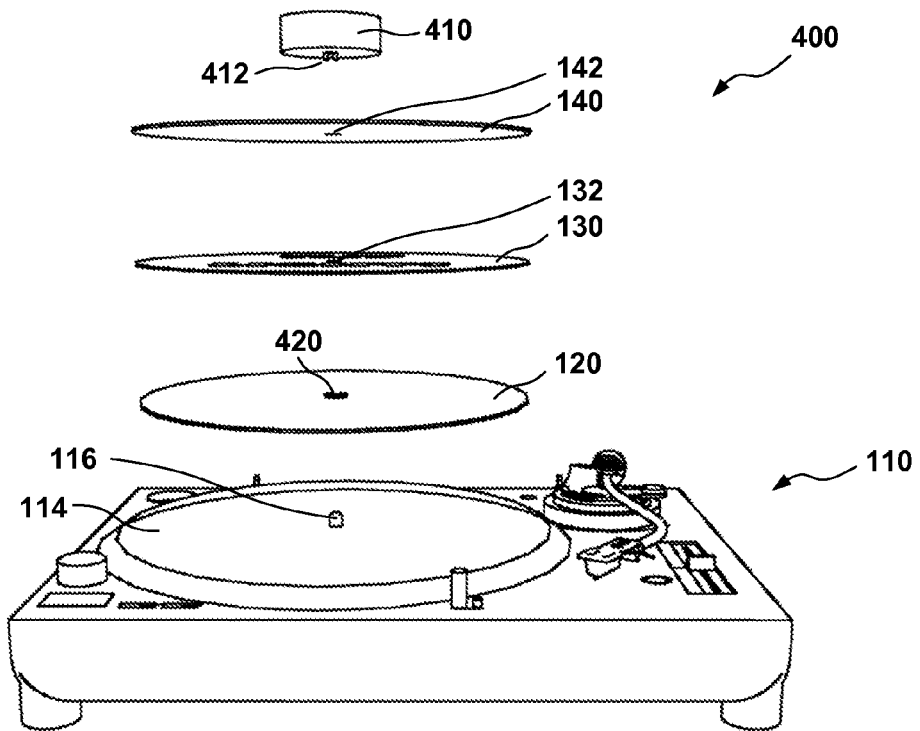
FIG. 4 is an exploded, perspective view of another example system for media playback.

FIG. 4 shows an alternative example system 400 for enhancing turntable playback. The system 400 is similar to the system 100, except that the system 400 includes an external battery unit 410 and the illumination apparatus 120, mask 130, and record 140 are adapted to allow the battery unit 410 to connect to the illumination apparatus 120. In this example, the battery unit 410 has a cylindrical shape with a diameter approximately the same or smaller than that of a typical record label (approximately 3.9 inches). Since little light is generally projected through record labels, the battery unit 410 does not reduce, or only minimally reduces, display space.

The battery unit 410 has a pair of electrical contacts 412 that extend down to make electrical connections with corresponding electrical contacts 420 of the illumination apparatus 120. The contacts 412 are preferably provided within an insulating annular ring. The insulation prevents the contacts from short-circuiting when the battery unit 410 is placed on the spindle 116, which is generally metal. The contacts 412 extend down through the insulation, for allowing electrical connections with the contacts 420. With the battery unit 410 in place, the insulating annular ring and contacts 412 extend down along and around the spindle 116 and through the holes 142 and 132 of the record 140 and mask 130, respectively. The holes 142 and 132 are enlarged slightly to accommodate space required for the annular ring. In use, the battery unit 410 sits on the spindle 116 with its contacts 412 engaged with the contacts 420. Preferably, the contacts 412 and 420 are constructed so that the battery unit 410 rests above the top of the record 140 with a slight clearance space between them. The clearance space allows a DJ to physically manipulate the record 140 (e.g., pause, reverse, scratch, etc.), without experiencing any resistance from friction with the battery unit 410.

In this arrangement, the illumination apparatus 120 does not require a charging port 212 or an internal battery 310. Rather, electrical power is supplied externally.

Figure 5:
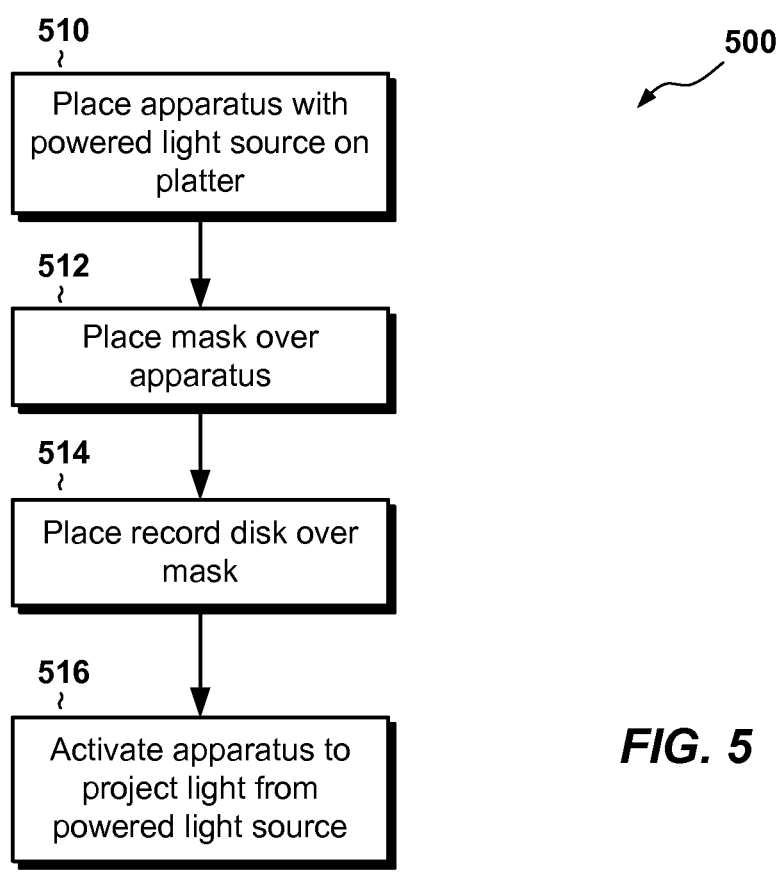
FIG. 5 is a flowchart showing a process for enhanced media playback.

FIG. 5 shows an example process for producing visual effects and thereby enhancing media playback. At step 510, a user places an illumination apparatus 120 on the platter 114 of a turntable 110. At step 512, the user may optionally place a mask 130 over the illumination apparatus 120. The mask can include any desired pattern, such as a picture, promotion, or logo. At step 514, the user places a record 140 over the mask 130 (or over the illumination apparatus 120, if no mask is used). At step 516, the illumination apparatus 120 is activated, such as by turning on the switch 218. Light is then projected up, through any mask 130 and through the record 140, where it may be viewed by audience members or anyone in the vicinity of the turntable 110.

Depending on the particular design of the illumination apparatus 120 and mask(s) 130, resulting visual displays can be produced covering a wide range of patterns, colors, and images. These visual displays can enhance a DJ's performance by providing advertising, promotions, amusement, and entertainment. Implementations can range from simple, fixed illumination patterns to complex, time-varying images. In one example, images are synchronized in time with music being played, to provide integrated audio/visual effects. Synchronization can be managed by an external computer that communicates with the illumination apparatus 120 via the communications port 312, or may be managed within the illumination apparatus 120. For instance. The illumination apparatus 120 may include a built-in microphone for sensing sounds in its environment and varying illumination patterns in response to the sounds. Many different effects and variations can be realized.

Having described certain embodiments, numerous alternative embodiments or variations can be made. For example, the battery 310 within the body 200 of the illumination apparatus 120 is shown and described as being charged via the charging port 216. However, the battery 310 may also be charged via electromagnetic induction. In one example, the platter 114 of the turntable 110 includes a first induction coil and the illumination apparatus 120 includes a second induction coil. The first induction coil receives power from the turntable 110, and the second induction coil receives power, via electromagnetic coupling, from the first induction coil. The second induction coil is coupled to the battery 310 to effect charging. The illumination apparatus 120 thus receives charge as it is being used, thereby extending the time required between charges via the charging port 216 or eliminating the need for charging via the charging port 216 altogether.

In another example, the battery unit 410, rather than the platter 114, is adapted to include the first induction coil. The battery unit 410 can thus apply its bulk battery storage to charge smaller batteries in the illumination apparatus 120. Again, charging can take place during use of the illumination apparatus 120, thus extending time between charges or eliminating the need for charging via the charging port altogether. Bulk storage batteries (e.g., ordinary battery cells) in the battery unit 410 may be periodically replaced or recharged.

Also, the illumination source is shown and described as RGB LEDs 210 coupled to light pipes 212. However, this is just an example. Other types of LEDs can be used, and other types of lights can be used. These include, for example, incandescent lights and florescent lights. In one example, the illumination source is a cold cathode fluorescent lamp (CCFL), such as the type that is used with conventional laptop computers. In another example, organic LEDs may be used, including those that employ graphene, to produce an illumination source that is bright, low power, and easily bendable. CCFLs, organic LEDs, and other light sources can be provided in panels installed within the illumination apparatus 120.

Also, although the illumination apparatus 120 preferably operates as a slipmat (with a slippery top surface 120*a*), this is not required. Alternatively, the apparatus 120 can be provided with a non-slippery top surface 120*a*. A separate slip mat can be used, or the masks 130 can be provided with slippery surfaces to act as slipmats.

Although the turntable 110 is shown and described as a record turntable for playing LP's, this is not required. Alternatively, it could be a smaller turntable, such as one for playing 45 RPM records, or it could be a turntable for playing compacts disks, DVD's, Laserdiscs, or other types of disks. The disks can store audio information, video information, and/or other forms of information.

Those skilled in the art will therefore understand that various changes in form and detail may be made to the embodiments disclosed herein without departing from the scope of the invention.

What is claimed is:

1. A system for media playback, comprising:
   a turntable having a base, a platter, and a spindle;
   a powered apparatus with a central hole, the powered apparatus disposed on the platter with the spindle extending through the central hole, the powered apparatus having a to surface and a powered light source for projecting light upwards through the top surface;
   a non-opaque record disk containing playback information, the non-opaque record disk disposed above the powered apparatus and having a hole through which the spindle extends; and
   a battery unit disposed above the non-opaque disk, the battery unit having a hole into which the spindle extends and supplying power to the powered apparatus.

2. The system of claim 1, wherein the powered apparatus further has a bottom surface, the bottom surface having a higher coefficient of friction than the top surface.

3. The system of claim 1, wherein the powered light source comprises a set of light emitting diodes (LEDs).

4. The system of claim 3, wherein the powered light source further comprises at least one light pipe coupled to at least one of the set of LEDs.

5. The system of claim 4, wherein the at least one light pipe is arranged in one of (i) a radial pattern, (ii) a circular pattern, or (iii) a spiral pattern.

6. The system of claim 1, wherein the powered light source comprises at least one cold cathode fluorescent lamp (CCFL).

7. The system of claim 1, further comprising a controller within the powered apparatus, the controller coupled to the light source for controllably illuminating the powered light source, wherein the controller is configurable for producing different patterns of light from the powered light source.

8. The system of claim 7, further comprising a communications interface coupled to the controller for wirelessly communicating with an external computing device for receiving display patterns therefrom.

9. The system of claim 7, wherein the powered light source comprises an electronic display panel.

10. The system of claim 7, wherein the powered light source comprises at least one RGB LED strip.

11. The system of claim 1, further comprising at least one disk-shaped mask disposed above the apparatus, the mask including a design with variable levels of opacity and/or color.

12. The system of claim 1,
    wherein the hole in the non-opaque disk has a diameter that is larger than the diameter of the spindle,
    wherein the powered apparatus has a pair of electrical contacting members proximate to the spindle, and
    wherein the battery unit has a pair of electrical contacting members that extend down through the hole in the non-opaque disk and make contact with the pair of electrical contacting members of the powered apparatus for delivering power to the powered apparatus.

13. The system of claim 1,
    wherein the platter of the turntable includes a first induction coil, wherein the powered apparatus includes a second induction coil, and
    wherein the first induction coil is constructed and arranged to transmit power to the second induction coil for powering the powered apparatus.

14. The system of claim 1, wherein the powered apparatus further has a bottom surface including one of rubber and neoprene.

15. The system of claim 1, wherein the powered apparatus is constructed and arranged to project light of approximately uniform brightness across the top surface of the powered apparatus.

16. The system of claim 1, wherein the powered apparatus has a circumference of approximately 12 inches and wherein the hole is sized to match the spindle of a phonograph turntable.

\* \* \* \* \*

UNITED STATES PATENT AND TRADEMARK OFFICE
CERTIFICATE OF CORRECTION

PATENT NO. : 8,707,338 B2
APPLICATION NO. : 13/237860
DATED : April 22, 2014
INVENTOR(S) : Joseph Ward It is certified that error appears in the above-identified patent and that said Letters Patent is hereby corrected as shown below:

In the Claims

Claim 1, Column 7, Line 46, "to surface" should read --top surface--.

Signed and Sealed this
Second Day of September, 2014

Michelle K. Lee
*Deputy Director of the United States Patent and Trademark Office*